(12) United States Patent
Yoshida (10) Patent No.: US 12,425,735 B2
(45) Date of Patent: Sep. 23, 2025

(54) IMAGE STABILIZING MECHANISM AND IMAGE CAPTURING APPARATUS

(71) Applicant: CANON KABUSHIKI KAISHA, Tokyo (JP)

(72) Inventor: Takashi Yoshida, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 119 days.

(21) Appl. No.: 18/415,081

(22) Filed: Jan. 17, 2024

(65) Prior Publication Data
US 2024/0251166 A1 Jul. 25, 2024

(30) Foreign Application Priority Data
Jan. 24, 2023 (JP) ................................ 2023-008853

(51) Int. Cl.
*H04N 23/68* (2023.01)
*H04N 23/52* (2023.01)

(52) U.S. Cl.
CPC ........... *H04N 23/687* (2023.01); *H04N 23/52* (2023.01)

(58) Field of Classification Search
CPC ............................. H04N 23/687; H04N 23/52
See application file for complete search history.

(56) References Cited

U.S. PATENT DOCUMENTS

| 2005/0180113 | A1* | 8/2005 | Shirakami | F28D 15/0233 |
| | | | | 257/E23.09 |
| 2012/0318484 | A1 | 12/2012 | Hirasawa | |
| 2018/0278814 | A1* | 9/2018 | Yamamoto | H04N 23/55 |
| 2021/0055679 | A1* | 2/2021 | Sato | G03G 15/2042 |
| 2021/0368101 | A1* | 11/2021 | Ishikawa | H04N 23/687 |
| 2022/0279126 | A1* | 9/2022 | Katsumata | H04N 23/667 |
| 2023/0035644 | A1* | 2/2023 | Kuroki | H05K 7/2039 |
| 2024/0323532 | A1* | 9/2024 | Abe | H04N 23/687 |
| 2024/0406560 | A1* | 12/2024 | Peng | H04N 23/685 |

FOREIGN PATENT DOCUMENTS

| JP | 2013-004783 A | | 1/2013 | |
| WO | WO-2021009892 A1 * | | 1/2021 | ............ G02B 21/36 |

\* cited by examiner

*Primary Examiner* — Padma Haliyur
(74) *Attorney, Agent, or Firm* — Cowan, Liebowitz & Latman, P.C.

(57) ABSTRACT

An image stabilizing mechanism that can sufficiently cool heat from an image sensor and have a heat dissipation member that does not hinder drive control of a movable part. The image stabilizing mechanism includes a holding part, a movable part that contacts a heat source and is held by the holding part so as to be movable in first and second directions, a drive unit that generates a driving force for driving the movable part, and a heat dissipation member that includes a heat transfer member and an elastic member. The heat dissipation member includes a sliding surface that slidingly contacts the movable part to be thermally connected and a holding surface that holds the movable part to be thermally connected. Frictional force generated on the sliding surface is not more than a half of maximum driving force of the movable part generated by the drive unit.

17 Claims, 9 Drawing Sheets

IMAGE STABILIZING MECHANISM AND IMAGE CAPTURING APPARATUS

BACKGROUND OF THE INVENTION

Field of the Invention

The present invention relates to image stabilizing mechanisms and image capturing apparatuses, and in particular, relates to an image stabilizing mechanism including a heat dissipation member and an image capturing apparatus including the image stabilizing mechanism.

Description of the Related Art

An image capturing apparatus, such as a digital still camera or a video camera, is equipped with an image sensor, such as a CMOS sensor or a CCD sensor, for capturing an object image and electronic elements, such as a CPU and an IC, mounted on a circuit board, and these elements generate heat. When temperature of the image sensor or the electronic elements excessively increases, performances of the image sensor or the electronic elements may be degraded or malfunction may occur, and thus, favorable image capturing may not be performed.

In recent years, an image capturing apparatus including an image stabilizing mechanism that stabilizes an image by moving an image sensor in directions orthogonal to an image capturing optical axis direction in order to improve image quality has been widely used. In an image capturing apparatus including the image stabilizing mechanism, heat generated from an image sensor during driving of the image stabilizing mechanism, continuous image capturing, and moving image capturing affects the image quality, and thus sufficient heat dissipation is required.

For example, Japanese Patent Laid-Open Publication No. 2013-4783 (Counterpart of US 20120318484 A1) discloses a configuration in which a heat dissipation member is provided between a movable part (high temperature part) and a fixed part (low temperature part) inside a display apparatus. The heat dissipation member is constituted by a cushion part and a heat conduction part provided on a surface of the cushion part and in contact with both the movable part and the fixed part.

However, since the prior art disclosed in the above publication largely deforms the cushion part inside the heat dissipation member in order to increase contact area of the heat dissipation member with the movable part and the fixed part, repulsive force due to the deformation of the cushion part is large.

The technique of the above publication does not control positions of the movable part and the fixed part, and a relative movement (sliding) amount between the movable part and the fixed part due to thermal expansion or the like is relatively large. Therefore, even if the repulsive force due to the deformation of the cushion part is large, frictional resistance generated between the movable part and the fixed part and the heat dissipation member rarely hinders the movement of the movable part.

In the meantime, when the technique of the above publication is applied to an image stabilizing mechanism of an image capturing apparatus, the movable part on which an image sensor is mounted is driven by a small driving force for image stabilization, and thus there is a problem in that the driving of the movable part is hindered by the frictional resistance between the movable part and the fixed part and the heat dissipation member generated by the repulsive force due to the deformation of the cushion part.

SUMMARY OF THE INVENTION

The present invention provides an image stabilizing mechanism and an image capturing apparatus that can sufficiently cool heat from an image sensor and have a heat dissipation member that does not hinder drive control of a movable part.

Accordingly, an aspect of the present invention provides an image stabilizing mechanism including a holding part, a movable part that is in contact with a heat source and is held by the holding part so as to be movable in a first direction and a second direction different from the first direction, a drive unit configured to generate a driving force for driving the movable part in the first and second directions, and at least one heat dissipation member that includes a heat transfer member and an elastic member. The at least one heat dissipation member includes a first connection surface thermally connected to the movable part and a second connection surface thermally connected to the holding part. One of the first connection surface and the second connection surface is a holding surface that holds a first member among the movable part and the holding part to be thermally connected. Another of the first connection surface and the second connection surface is a sliding surface that is slidingly in contact with a second member among the movable part and the holding part to be thermally connected. And frictional force generated on the sliding surface is not more than a half of maximum driving force of the movable part generated by the drive unit.

According to the present invention, it is possible to provide the image stabilizing mechanism and the image capturing apparatus that can sufficiently cool heat from the image sensor and have the heat dissipation member that does not hinder drive control of the movable part.

Further features of the present invention will become apparent from the following description of exemplary embodiments with reference to the attached drawings.

DESCRIPTION OF THE EMBODIMENTS

Hereafter, embodiments according to the present invention will be described in detail by referring to the drawings.

Figure 1:
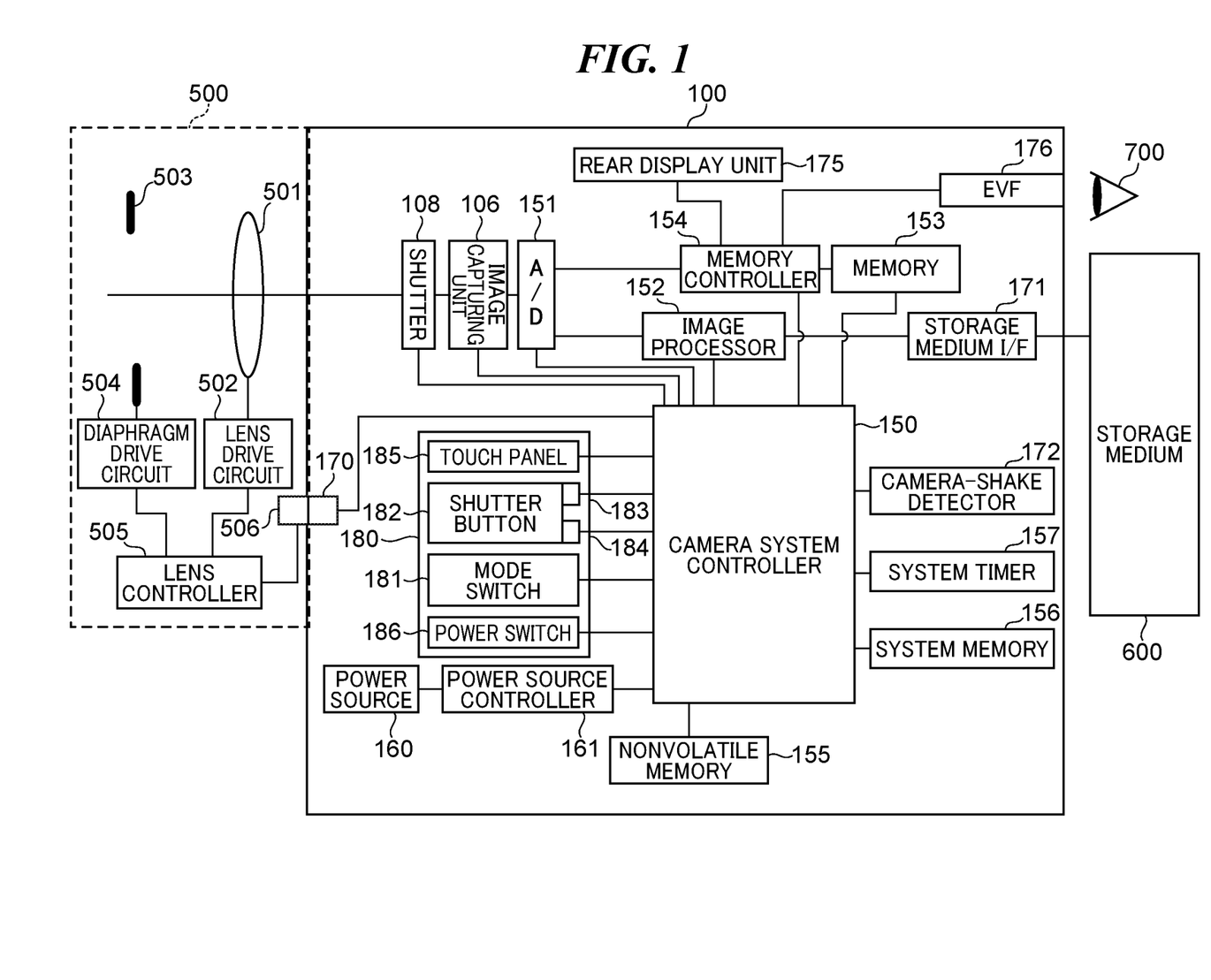
FIG. 1 is a block diagram showing an internal configuration of a digital camera as an image capturing apparatus according to a first embodiment of the present invention.

FIG. 1 is a block diagram showing an internal configuration of a digital camera (hereinafter, simply referred to as a camera) 100 as an image capturing apparatus according to a first embodiment of the present invention.

A lens unit 500 including a lens 501 and a lens communication terminal 506, and a storage medium 600 are detachably (replaceably) mounted on the camera 100. Although only one lens 501 is shown in FIG. 1 in order to simplify the description, a plurality of lenses are actually provided.

As shown in FIG. 1, the camera 100 includes a shutter 108, an image capturing unit 106, an A/D converter 151, an image processor 152, a memory controller 154, a memory 153, a camera system controller 150, a nonvolatile memory 155, and a system memory 156. The camera 100 also includes a system timer 157, a power source 160, a power source controller 161, a camera communication terminal 170, a storage medium I/F 171, a camera-shake detector 172, a rear display unit 175, an EVF display unit 176, and an operation unit 180.

The image capturing unit 106 includes an image sensor 115 (see FIG. 3A) described later and a image stabilizing mechanism that drives the image sensor 115 in a plane perpendicular to the optical axis of the lens unit 500. The shutter 108 is a focal plane shutter that controls an exposure time of the image sensor 115. An operation of the shutter 108 is controlled by the camera system controller 150 described later.

The image sensor 115 is constituted by a CCD sensor or a CMOS sensor, and photoelectrically converts (captures) an object image (optical image) formed by light that has passed through the lens 501 into an image capturing signal (analog signal) and outputs the image capturing signal.

The A/D converter 151 converts the analog image capturing signal output from the image sensor 115 into a digital image capturing signal. The digital image capturing signal is written in the memory 153 via the image processor 152 and the memory controller 154 or via only the memory controller 154.

The image processor 152 applies image processes, such as a pixel interpolation process, a resizing process, and a color conversion process, in the digital image capturing signal from the A/D converter 151 or the memory controller 154 to generate image data. The image processor 152 also applies an auto white balance process based on the result of calculation using the image data.

The camera system controller 150 is constituted by a computer including a processor like a CPU and a circuit, and controls the entire camera 100 and the lens unit 500 by executing a program recorded in the nonvolatile memory 155. For example, the camera system controller 150 controls the image sensor 115 and the shutter 108 in response to an image capturing instruction from a user, and controls autofocus and an aperture on the basis of the image data generated by the image processor 152.

The memory 153 temporarily stores the digital image capturing signal output from the A/D converter 151 and the image data generated by the image processor 152. The memory controller 154 controls data transfer among the A/D converter 151, the image processor 152, and the memory 153. The nonvolatile memory 155 is an electrically erasable and recordable read-only memory, and stores constants, programs, and the like for the operation of the camera system controller 150.

The system memory 156 is a readable and writable memory that stores constants and variables for the operation of the camera system controller 150, a program read from the nonvolatile memory 155, etc.

The system timer 157 measures a non-operation time until auto power off for setting the camera 100 to a power saving state in order to prevent consumption of a battery when the camera 100 is not operated by a user, and an exposure time of the image sensor 115 by the shutter 108.

The power source 160 is constituted by a primary battery, a secondary battery, or an AC adapter. The power source controller 161 determines whether a battery is attached to the power source 160 and a type of an attached battery, detects a remaining battery level, and supplies a necessary voltage to a supply destination at a necessary timing.

The camera communication terminal 170 is electrically connected to the lens communication terminal 506 provided in the lens unit 500, and enables communication between the camera system controller 150 and a lens controller 505 in the lens unit 500.

The storage medium I/F 171 is an interface with the storage medium 600 detachably mounted on the camera 100. The storage medium 600 is a memory card, a FLASH (registered trademark) memory, a hard disk, or the like, and records image data (still image or moving image) generated by the image processor 152.

The camera-shake detector 172 is constituted by a gyro sensor or the like, and outputs a signal corresponding to a shake of the camera 100 (hereinafter referred to as a camera shake) due to a hand shake or the like.

The A/D converter 151, the image processor 152, the camera system controller 150, the memory controller 154, the system timer 157, and the power supply controller 161 described above are mounted on a main substrate 107 (see FIG. 2) as electronic elements, such as a CPU and ICs. Similarly, the memory 153, the nonvolatile memory 155, and the system memory 156 are mounted on the main substrate 107 as electronic elements, such as memory chips. The storage medium I/F 171 and the camera-shake detector 172 are mounted on the main substrate 107 as electronic elements, such as ICs and sensor elements.

The memory 153 described above also serves as a memory for image display (video memory). A digital image capturing signal and image data written in the memory 153 are displayed as a live view image and a capturing confirmation image on the rear display unit 175 provided on a rear surface of the camera 100 and the EVF display unit 176 arranged in a finder via the memory controller 154. Each of the rear display unit 175 and the EVF display unit 176 is constituted by a display element, such as a liquid crystal panel or an organic EL panel. A user can observe the image displayed on the EVF display unit 176 by bringing an eye 700 close to the EVF display unit 176.

The operation unit 180 is an input unit that receives an operation by a user, and outputs a signal corresponding to the received operation to the camera system controller 150.

The operation unit 180 includes various operation members, such as a mode switch 181, a shutter button 182, a touch panel 185, and a power switch 186. The shutter button 182 is in conjunction with a first shutter switch 183 and a second shutter switch 184. The mode switch 181 is operated to switch between image capturing modes, such as still image capturing and moving image capturing. The shutter button 182 is operated by the user to issue an image capturing preparation instruction and an image capturing instruction. The first shutter switch 183 is turned on by a half-press operation of the shutter button 182 and outputs a SW1 signal to the camera system controller 150. The second shutter switch 184 is turned on by a full-press operation of the shutter button 182 and outputs a SW2 signal to the camera system controller 150. The camera system controller 150 performs image capturing preparation operations (auto-focus, autoexposure, auto white balance, etc.) in response to the SW1 signal, and performs an image capturing process of a recording still image in response to the SW2 signal.

The touch panel 185 is provided on the rear display unit 175. The power switch 186 is operated to switch ON/OFF of power supply of the camera 100.

The lens communication terminal 506 is connected to the camera communication terminal 170 to enable communication between the lens unit 500 and the camera 100. The lens unit 500 further includes a lens drive circuit unit 502, a diaphragm 503, and a diaphragm drive circuit 504. When receiving a control instruction from the camera system controller 150 via communication, the lens controller 505 controls an aperture (aperture value) of the diaphragm 503 and a focus of the lens 501 via the diaphragm drive circuit 504 and the lens drive circuit 502.

Figure 2:
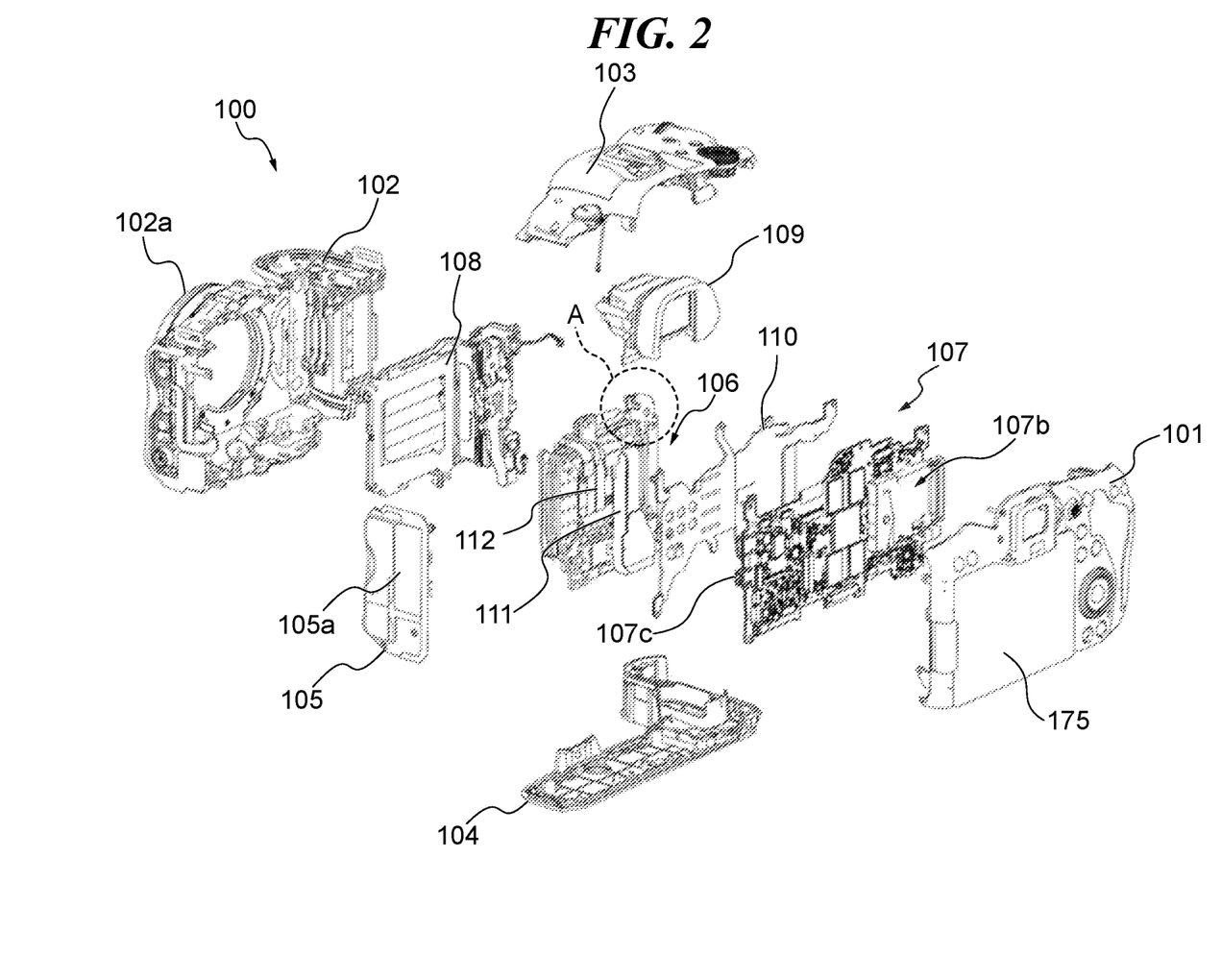
FIG. 2 is a rear exploded perspective view showing the digital camera in FIG. 1.

FIG. 2 is a rear exploded perspective view showing the camera 100. The camera 100 includes a front base 102, a rear cover 101, a top cover 103, a bottom cover 104, and a side cover 105 as exterior members.

The front base 102 is formed of magnesium die-cast or plastic, and is provided with a mount 102*a* to which the lens unit 500 is attached, and a grip portion for a user to hold the camera 100.

A plurality of operation members that can be operated by a user and the rear display unit 175 that can be opened and closed are attached to the rear cover 101. A finder unit 109 incorporating the EVF display unit 176 is attached to the rear cover 101.

The plurality of operation members (the mode switch 181, the shutter button 182, the power switch 186, etc.) that can be operated by a user are attached to the top cover 103.

The bottom cover 104 has a battery lid that closes an opening of a battery chamber and an opening for exposing a tripod base that is fixed to a bottom surface of the front base 102.

A terminal cover 107*c* for protecting an external communication terminal 105*a* described later is attached to the side cover 105.

Inside these exterior members, the image capturing unit 106 including the image sensor 115 and the image stabilizing mechanism, the main substrate 107, the shutter 108, and a metal chassis 110 are disposed.

The main substrate 107 is constituted by a multilayer substrate. Various electronic components including the electronic elements described above are mounted on both surfaces of the main substrate 107. The main substrate 107 is fixed to the front base 102 and the metal chassis 110 with screws. Further, the main substrate 107 is provided with a storage medium connector 107*b* for accommodating the storage medium 600 and an external communication terminal 107*c* to which a cable for connecting an external device is connected.

The image capturing unit 106 is electrically connected to the main substrate 107 via a plurality of FPCs. An image capturing signal FPC 111 includes wirings that transmit an image capturing signal output from the image sensor 115 to the camera system controller 150 on the main substrate 107 and transmit a control signal necessary for driving the image sensor 115 from the camera system controller 150 to the image capturing unit 106. An image capturing power supply FPC 112 includes wirings for supplying power for driving the image sensor 115 from the power supply controller 161 to the image sensor 115.

The image sensor 115 (a heat source) is a particular part in the camera 100 that consumes a large amount of power and generates a large amount of heat, and thus the temperature thereof easily increases. An image-capturing available time of the camera 100 is limited by an operation guaranteed temperature of the image sensor 115 except for a remaining battery level. In order to prolong the image-capturing available time as possible, it is necessary to cool the image sensor 115 so that the temperature thereof will not exceed the operation guaranteed temperature. Therefore, the image capturing unit 106 including the image sensor 115 is fixed to the front base 102 with screws so that heat of the image capturing unit 106 will be transmitted to the front base 102.

Figure 3A:
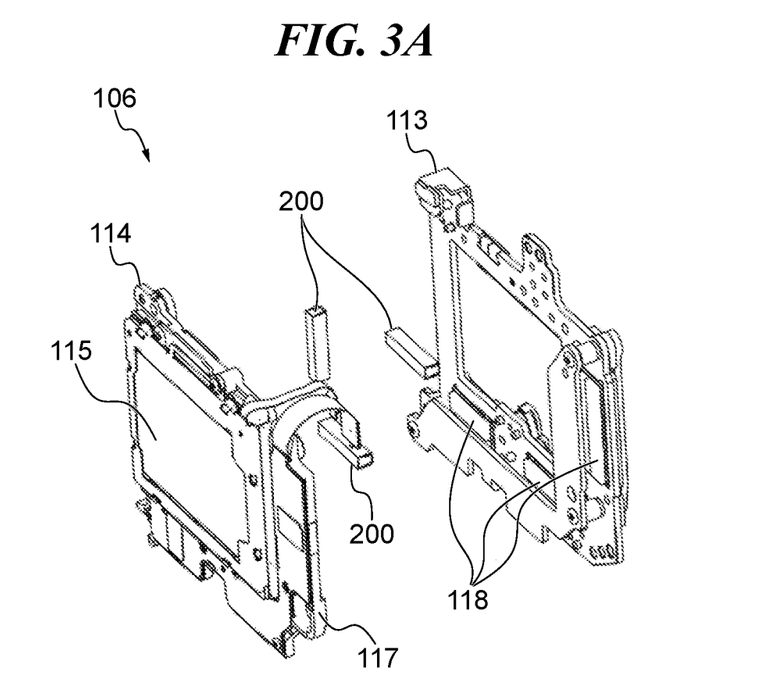
FIG. 3A and FIG. 3B are front and rear exploded perspective views showing an image capturing unit in FIG. 2 and an image stabilizing mechanism therein.
Figure 3B:
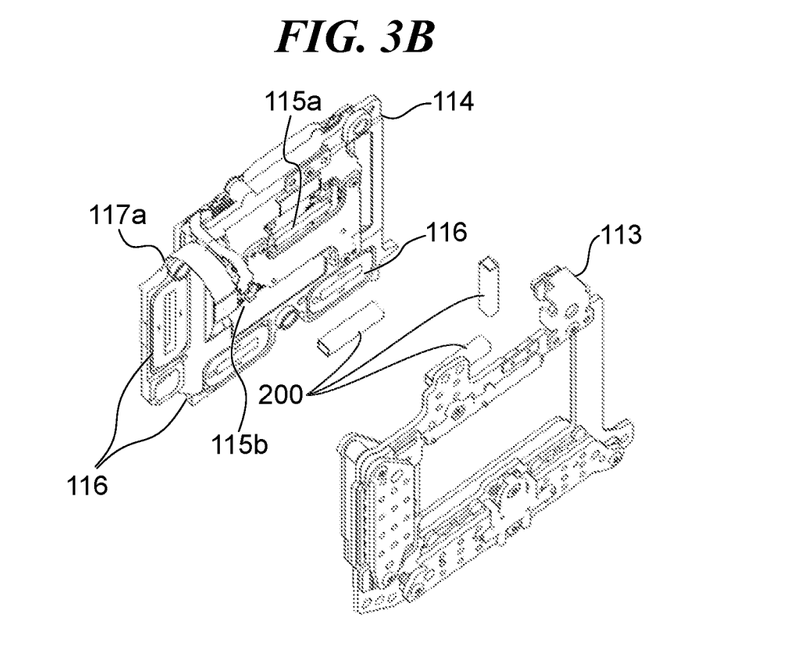

FIG. 3A and FIG. 3B are front and rear exploded perspective views showing the image capturing unit 106 in FIG. 2 and the image stabilizing mechanism therein.

The image capturing unit 106 includes a movable part 114 that holds the image sensor 115 and is movable in two directions (a horizontal direction (first direction) and a vertical direction (second direction)) orthogonal to an image capturing optical axis (an optical axis of the lens unit 500) and orthogonal to each other, and a holding part 113 that holds the movable part 114 so as to be movable in the two directions. The movable part 114 includes a sensor holder 117 to which the image sensor 115 is fixed by adhesion. The image sensor 115 is constituted by fixing a sensor chip having a plurality of pixels to an image capturing substrate 115*a* by adhesion and by electrically connecting electrodes of the sensor chip and an image capturing circuit on the image capturing substrate 115*a* by wire bonding. Sensor electronic elements 115*a*, such as capacitors, resistors, and regulators, constituting the image capturing circuit are mounted on a rear surface (back surface) of the image capturing substrate 115*b* opposite to the sensor chip attachment surface. A plurality of heat dissipation members 200 are provided so as to be nipped between the movable part 114 and the holding part 113. In this embodiment, three heat dissipation members 200 are arranged.

Three coils 116 (a drive unit) are fixed to the sensor holder 117. The holding part 113 holds three magnets 118 (the drive unit) so as to face the three coils 116. The movable part 114 is attracted in the image capturing optical axis direction (to the rear side) by the magnetic force of the magnet 118. Balls (not shown) held by ball holding parts 117*a* provided at positions of the sensor holder 117 are arranged between the movable part 114 and the holding part 113. Thus, the movable part 114 is positioned in the image capturing optical axis direction with respect to the holding part 113 via the balls. It should be noted that the three coils 116 may be held by the holding part 113 and the three magnets 118 may be held by the sensor holder 117.

In the image capturing unit 106 constituted as described above, the image sensor 115 can be moved in the two directions described above by controlling energization of the three coils 116 so as to generate driving forces between the coils 116 and the magnets 118 facing the coils. The camera system controller 150 controls the energization of the coils 116 (hereinafter referred to as drive control) so as to move the movable part 114 in a direction in which image blur due to a camera shake is reduced (corrected) according to the camera shake detected through the camera-shake detector 172. That is, the image stabilizing mechanism according to this embodiment is constituted by the movable part 114 including the sensor holder 117, the holding part 113, the coils 116, the magnets 118, and the balls.

Next, a configuration for performing efficient heat dissipation by the heat dissipation members 200 described above will be described with reference to FIG. 4, FIG. 5A, and FIG. 5B.

Figure 4:
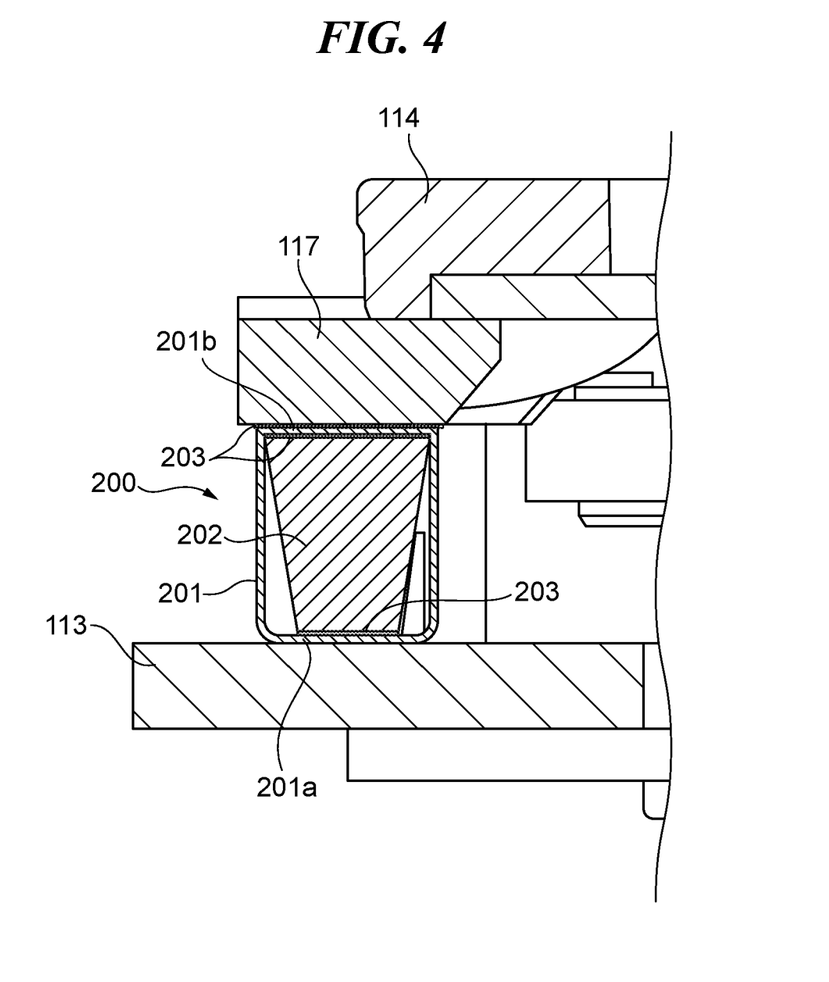
FIG. 4 is a sectional view showing a vicinity "A" shown in FIG. 2 of a heat dissipation member provided in the image stabilizing mechanism according to the first embodiment.
Figure 5A:
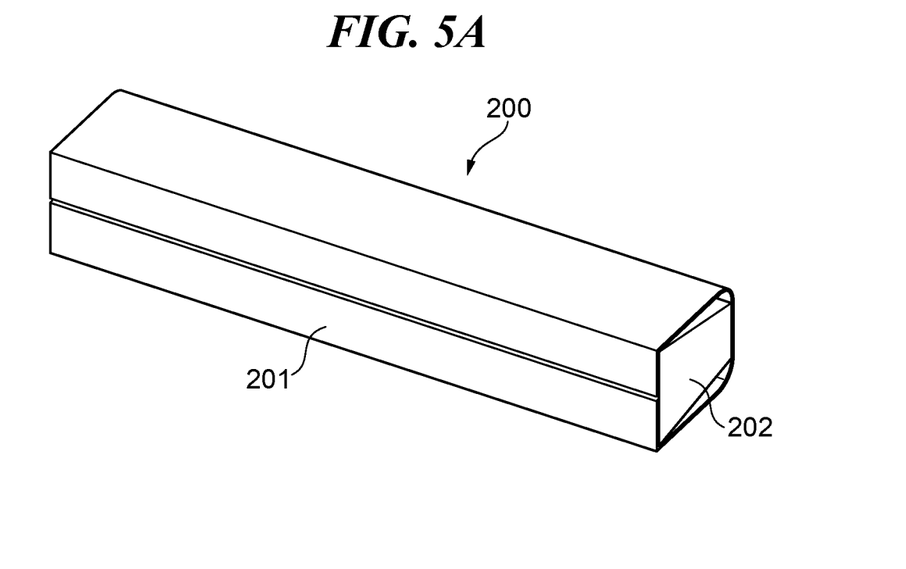
FIG. 5A and FIG. 5B are perspective and front views showing the heat dissipation member in FIG. 4.
Figure 5B:
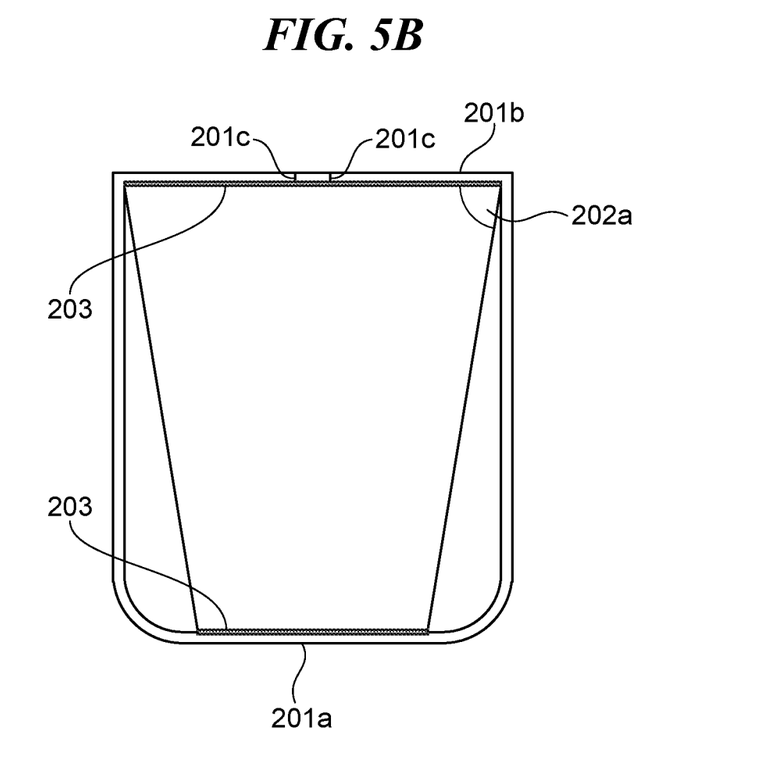

FIG. 4 is a sectional view showing a vicinity "A" shown in FIG. 2 of one of the heat dissipation members 200 provided in the image stabilizing mechanism according to the first embodiment. FIG. 5A and FIG. 5B are perspective and front views showing the heat dissipation member 200.

The heat dissipation member 200 is constituted by a heat transfer member 201, an elastic member 202, and adhesive members 203. The heat transfer member 201 is formed of a thin film-like member having high thermal conductivity such as a graphite sheet, and thermally connects the holding unit 113 and the sensor holder 117 to each other, thereby transferring heat generated from the image sensor 115 as the heat source from the movable part 114 side to the holding part 113 side. In addition, the heat transfer member 201 has no disconnected part, such as a cut or a slit, in a direction intersecting a heat dissipation direction in an area between a sliding surface 201a (a first connection surface) and a holding surface 201b (a second connection surface). As a result, heat is sufficiently transferred.

The elastic member 202 is a soft member, such as porous urethane foam or soft rubber. The heat transfer member 201 is wound around the elastic member 202.

The adhesive members 203 are thermally conductive double-sided tapes, and adhesively fix the heat transfer member 201 and the elastic member 202, and the heat transfer member 201 and the sensor holder 117, respectively.

Since the heat transfer member 201 and the movable part 114 are fixed by the adhesive member 203 as described above, the heat dissipation member 200 moves with the driving of the movable part 114. In other words, the heat transfer member 201 has the sliding surface 201a that slides while being thermally connected to the holding part 113 (a second member) and the holding surface 201b that is thermally connected to and fixed to the sensor holder 117 (a first member) and moves together with the sensor holder 117. The surface of the holding part 113 that contacts the sliding surface 201a is subjected to a smoothing process by polishing, high-precision processing, etc.

The heat dissipation member 200 is nipped between the movable part 114 and the holding part 113, and thus the elastic member 202 is deformed so as to be compressed in the vertical direction in FIG. 4, and the contact state between the heat transfer member 201 and the holding part 113 is maintained. When the movable part 114 moves in this state, frictional resistance is generated between the sliding surface 201a and the holding part 113 in a direction opposite to the driving direction of the movable part 114.

As described in the above-described publication, when the positions of the movable part and the fixed part are not controlled and the amount of relative movement (sliding) between the movable part and the fixed part due to thermal expansion is relatively large, the frictional resistance generated between the movable part and the fixed part and the heat dissipation member rarely hinders the driving of the movable part. That is, even if the heat dissipation member is largely deformed and the repulsive force due to the deformation of the elastic member inside the heat dissipation member is increased, no serious problem occurs.

However, the image stabilizing mechanism in this embodiment performs the image stabilization by driving the movable part 114 with a small driving force generated from the coils 116 and the magnets 118, and the amount of relative movement (sliding) between the movable part 114 and the holding part 113 is relatively small. Furthermore, the position of the movable part with respect to the holding part 113 is controlled with high accuracy by drivingly controlling the movable part 114 so as to perform a plurality of reciprocating movements in a short time of 1 second or less in a substantial entire drive control area. Therefore, when a large frictional resistance is generated between the sliding surface 201a and the holding part 113, not a simple position control but a complicated control in consideration of a speed vector is required to exhibit the performance of the image stabilizing mechanism, which increases the apparatus cost. That is, in order to achieve both low cost and heat dissipation, it is desirable that the frictional resistance generated between the sliding surface 201a and the holding part 113 be small and that the variation in the frictional resistance be small.

Specifically, when the maximum driving force generated by the coils 116 is 100%, the frictional resistance (frictional force) needs to be 50% or less (half or less). The reason is that, if the frictional resistance exceeds 50%, the variation in the frictional resistance due to hysteresis exceeds the range of +50% to −50% (exceeds 100% in width), and thus stable driving is difficult depending on the position and the driving direction of the movable part 114. In this embodiment, since the three heat dissipation members 200 are provided, the sum of all the frictional resistances (frictional forces) is 50% or less (half or less) in the entire drive control area. Specifically, in the configuration of this embodiment, the maximum driving force generated from the coils 116 and the magnets 118 is about 0.1N to 10N, and therefore, the total frictional resistance (frictional force) generated from the three heat dissipation members 200 is set to be 5N or less at the maximum.

Generally, magnitude of frictional resistance is proportional to vertical resistance and a friction coefficient. Therefore, in order to reduce the frictional resistance by the heat dissipation members 200, it is important to reduce the repulsive force of the elastic member 202 and reduce the friction coefficient at the sliding surface 201a.

Here, in order to reduce the repulsive force of the elastic member 202, it is necessary to employ a soft material having a small elastic modulus, such as urethane foam for the elastic member 202 and to reduce the amount of deformation as possible. In the meantime, since a component tolerance is necessarily generated, it is necessary that the sliding surface 201a contacts the holding part 113 even when the distance between the holding part 113 and the movable part 114 is the longest within the range of the component tolerance and that the repulsive force of the elastic member 202 is sufficiently small even when the distance between the holding part 113 and the movable part 114 is the shortest within the range of the component tolerance. Therefore, in this embodiment, the components are designed so that the component tolerance of the distance between the holding part 113 and the movable part 114 is less than ±0.5 mm.

In order to reduce the friction coefficient of the sliding surface 201a, it is effective to smooth the surface of the holding part 113 that come into contact with the sliding surface 201a or to adhere a smooth member to the surface.

The movable part 114 is linearly and rotationally driven. From a viewpoint of the drive control, it is preferable that variation in the frictional resistance of the heat dissipation member 200 is small as possible in any case.

In order to ensure the heat dissipation performance of the heat dissipation member 200, it is important that the sliding surface 201a does not separate from the holding part 113 during the movement of the movable part 114 in addition to the above-described tolerance setting. Therefore, in this embodiment, the elastic member 202 has an isosceles trapezoidal cross section as shown in FIG. 5B so that a side fixed to the movable part 114 is long and a side relatively moving with respect to the holding part 113 is short. A long-side interior angle 202a, which is an interior angle on the long side of the trapezoid, is set such that a deformation angle (an angle at which the elastic member 202 is maximally deformed in a shearing direction by generated friction) obtained from the frictional resistance during driving and the elastic coefficient of the elastic member 202 does not exceed 90°. Thus, when the movable part 114 moves in the lateral direction in FIG. 5B, the sliding surface 201a on the short side moves to the left and right due to the deformation of the elastic member 202, but the sliding surface 201a does not move to the outside of the holding surface 201b on the long side. Note that, since the left and right long-side inner angles 202a are equal to each other, the frictional resistance generated between the sliding surface 201a and the holding part 113 for the same moving amount can be made equal regardless of whether the movable part 114 is driven to the left or right. Further, since the sliding surface 202a is more stable as the long-side inner angle 201a is larger, it is preferable to set the long-side inner angle to a large angle within a range not exceeding 90°.

The heat transfer member 201 is wound around the elastic member 202 as described above. And both end portions 201c of the heat transfer member 201 are disposed so as to be included in the holding surface 201b as shown in FIG. 5B. As a result, since the end portions 201c are not disposed in the sliding surface 201a side, it is possible to prevent unnecessary increase in frictional resistance due to unevenness of the end portions 201c during sliding.

The end portions 201c are arranged so as not to overlap each other at the holding surface 201b side. This can reduce variation in the thicknesses of the heat transfer member 201 at the holding surface 201b side, and thus can suppress the unintentional deformation of the elastic member 202 when the heat dissipation member 200 is nipped between the holding part 113 and the movable part 114.

The heat dissipation member 200 may be formed by stacking a plurality of heat transfer members 201 to increase heat dissipation efficiency. Even in this case, the end portions 201c of all the heat transfer members 201 preferably satisfies the above-described requirement.

In this embodiment, the heat dissipation member 200 is fixed to the movable part 114 and slides on the holding part 113. However, this configuration is not limiting as long as the sliding surface 201a is at one side of the movable part 114 side and the holding part 113 side and the holding surface 201b is at the other side. That is, the heat dissipation member 200 may be fixed to the holding part 113 and may slide on the movable part 114. When the heat dissipation member 200 is fixed to the holding part 113, the sliding surface 201a may contact a flat surface of the image capturing substrate 115a instead of the sensor holder 117. In this case, the flat surface of the image capturing substrate 115a on which the sliding surface 201a slides is preferably a smooth surface like a copper foil opening part subjected to the smoothing process, because the frictional resistance can be reduced.

Figure 6:
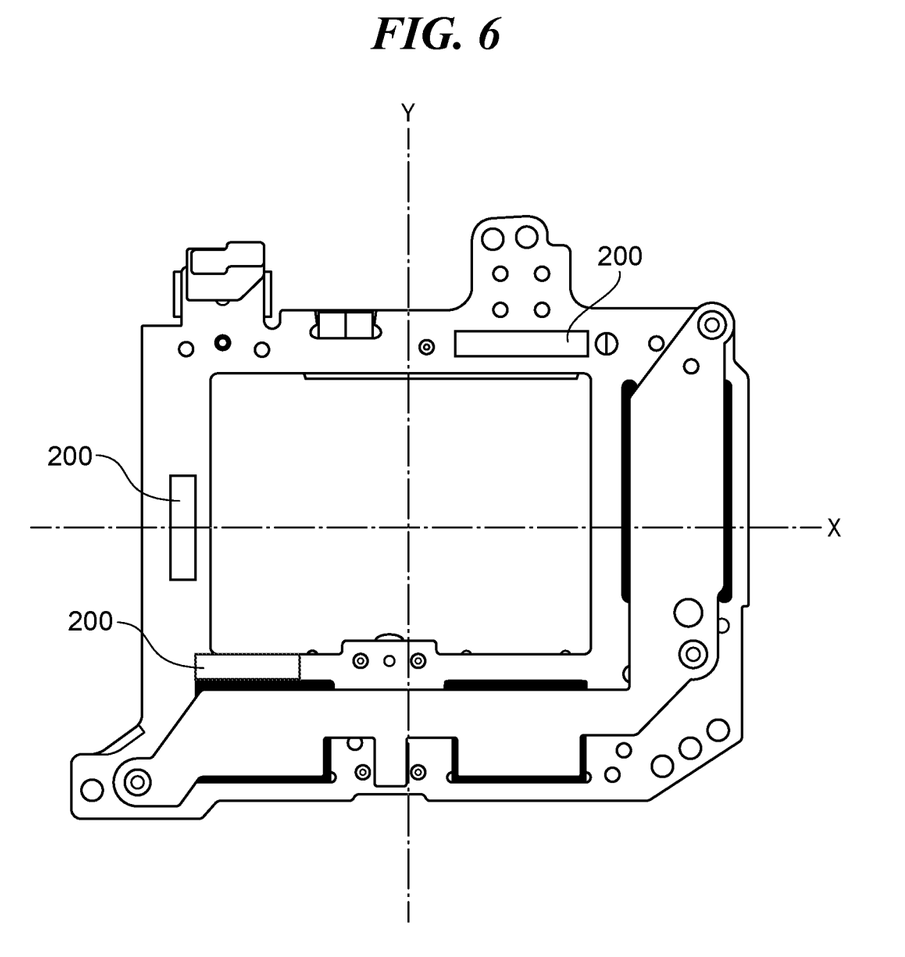
FIG. 6 is a view showing an arrangement of the heat dissipation members according to the first embodiment provided in a holding part.

FIG. 6 is a view showing the arrangement of the heat dissipation member 200 provided in the holding part 113.

When the movable part 114 linearly moves along drive axes (an X-axis and a Y-axis) in FIG. 6, it is preferable to arrange the heat dissipation members 200 to the holding part 113 so that products of distances from a drive axis and areas of the sliding surfaces 201a will not biased for each of the drive axes. That is, the heat dissipation members 200 are arranged so that a product of a distance from the X-axis and an area of a sliding surface of one of the heat dissipation members 200 will be about equal to such a product of another of the heat dissipation members 200 and so that a product of a distance from the Y-axis and an area of a sliding surface of one of the heat dissipation members 200 will be about equal to such a product of another of the heat dissipation members 200. When the movable part 114 rotationally moves, it is preferable to arrange the heat dissipation members 200 at positions away from the vicinity of the center of the movable part 114, which is the center of rotation, so that the heat dissipation members 200 will not be twisted. Therefore, in this embodiment, the heat dissipation members 200 are disposed in regions that does not overlap the image sensor 115 when viewed in the image capturing optical axis direction.

Figure 7A:
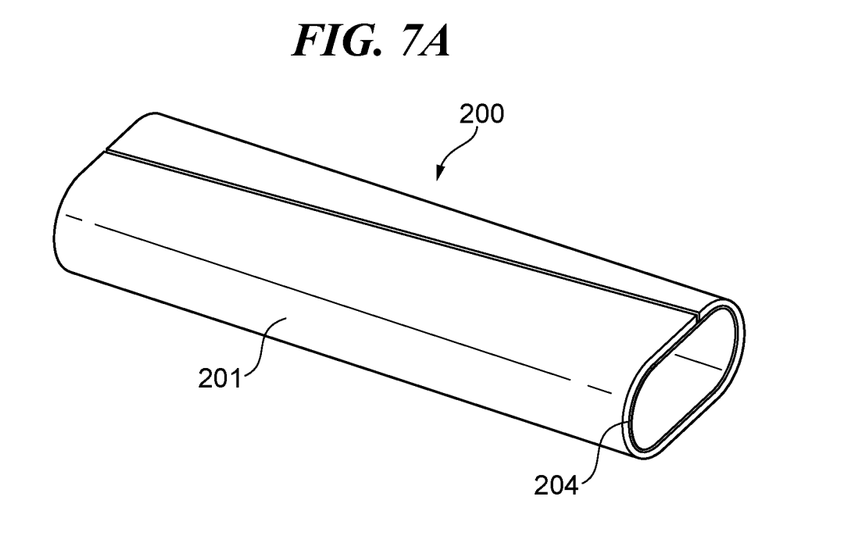
FIG. 7A and FIG. 7B are perspective and front views showing a heat dissipation member according to a first variation example of this embodiment.
Figure 7B:
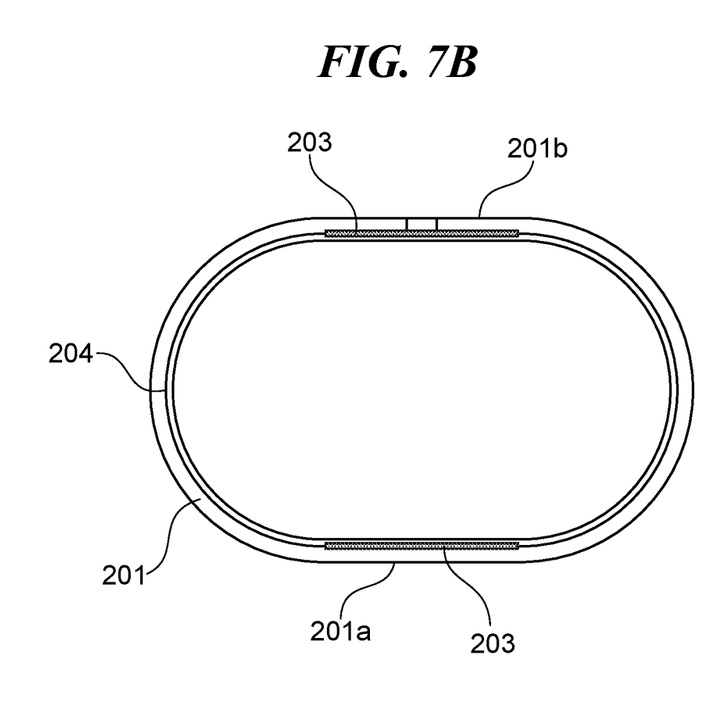

FIG. 7A and FIG. 7B are perspective and front views showing a heat dissipation member 200 according to a first variation example of this embodiment. As shown in FIG. 7A and FIG. 7B, an elastic member 204 is used inside the heat dissipation member 200 instead of the elastic member 202. The elastic member 204 is formed by shaping an elastic film material like PET into an elongated cylindrical shape. When the material of the film used for the elastic member 204 is PET, a film thickness is preferably in a range of 0.01 mm to 0.5 mm from viewpoints of shape retention and frictional resistance. The first variation example is particularly suitable for an apparatus that is desired to suppress dust generation from the elastic member 204.

Figure 8:
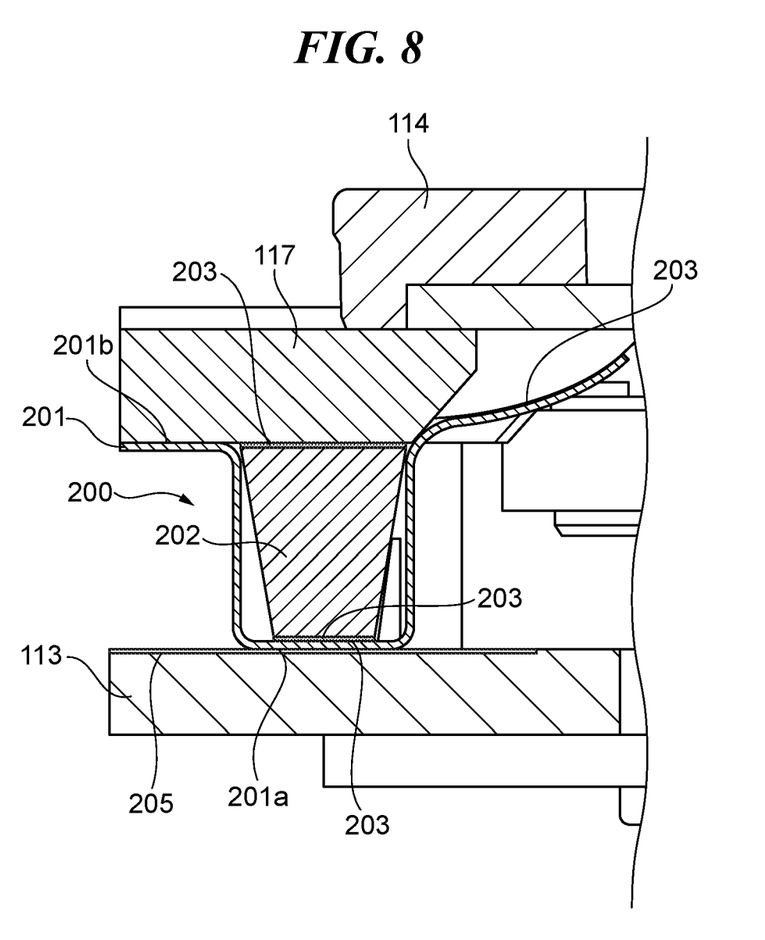
FIG. 8 is a sectional view showing the vicinity "A" shown in FIG. 2 of a heat dissipation member provided in an image stabilizing mechanism according to a second variation example of this embodiment.

FIG. 8 is a sectional view showing the vicinity "A" shown in FIG. 2 of a heat dissipation member provided in an image stabilizing mechanism according to a second variation example of this embodiment. As shown in FIG. 8, the elastic member 202 is directly adhered to the sensor holder 117 with the adhesive member 203, and the heat transfer member 201 is disposed so as to cover the elastic member 202 and to be in close contact with the sensor holder 117 even in a portion other than the elastic member 202. The heat transfer member 201 is fixed with the adhesive members 203 so as to be in contact with both the sensor holder 117 and the elastic member 202. A smooth member 205 reduces friction in sliding the sliding surface 201a and is adhered to the holding part 113 with the adhesive member 203. The smooth member 205 is made of a material like a Teflon (registered trademark) sheet of which a static friction coefficient and a dynamic friction coefficient are close and are small in order to improve controllability. The heat dissipation member 200 dissipates heat from the movable part 114 to the holding part 113 via the smooth member 205 while sliding the sliding surface 201a on the smooth member 205. The smooth member 205 may be a coating like a Teflon coating applied to the surface of the holding part 113 or the heat transfer member 201 instead of the Teflon sheet. Since the frictional resistance of the sliding surface 201a is reduced by the smooth member 205, this variation example is particularly suitable for an apparatus that is desired to further improve the position controllability of the movable part 114.

Figure 9:
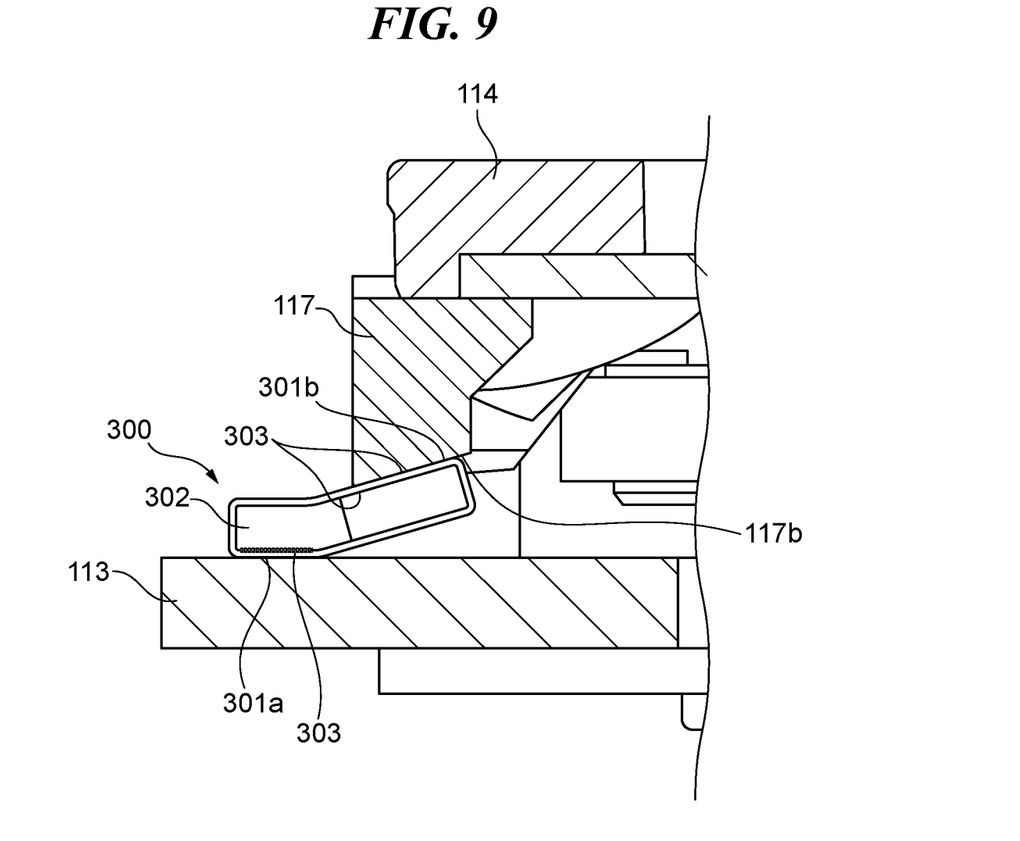
FIG. 9 is a sectional view showing the vicinity "A" shown in FIG. 2 of a heat dissipation member provided in an image stabilizing mechanism according to a third variation example of this embodiment.

FIG. 9 is a sectional view showing the vicinity "A" shown in FIG. 2 of a heat dissipation member provided in an image stabilizing mechanism according to a third variation example of this embodiment. The image stabilizing mechanism is provided with a heat dissipation member 300 in FIG. 9 instead of the heat dissipation member 200 and a sliding surface 301a slides on the holding part 113. FIG. 9 shows a state where the sensor holder 117 is moved to the most left side in the drawing.

The heat dissipation member 300 is constituted by a heat transfer member 301, an elastic member 302, and adhesive members 303. The heat transfer member 301 is formed of a thin film-like member having high thermal conductivity, such as a graphite sheet, and thermally connects the holding unit 113 and the sensor holder 117 to each other, thereby transferring heat from the movable part 114 to the holding part 113. The elastic member 302 is a soft member, such as porous urethane foam or soft rubber, and the heat transfer member 301 is wound around the elastic member 302. The adhesive members 303 are thermally conductive double-sided tapes, and adhesively fix the heat transfer member 301 and the elastic member 302, and the heat transfer member 301 and the sensor holder 117, respectively.

A holding surface 301b of the heat dissipation member 300 is fixed to an inclined surface 117b (a first inclined surface) of the movable part 114, which is not parallel to the driving plane, with the adhesive member 303. Accordingly, the heat dissipation member 300 is deformed to be folded.

The heat dissipation member 300 is partially pasted to the inclined surface 117b, and a clearance is partially provided between the heat transfer member 301 and the elastic member 302 to prevent interference between the heat transfer member 301 and the elastic member 302 due to deformation, thereby suppressing an increase in frictional resistance.

The sliding surface 301a of the heat dissipation member 300 slides on the holding part 113. Since there is no structure at the opposite side of the sliding surface 301a in the image capturing optical axis direction (the vertical direction in FIG. 9), the elastic member 302 is not nipped, and thus repulsive force is not generated. Therefore, the frictional resistance generated in the sliding surface 301a can be reduced.

As described above, the controllability during the rotational driving is improved as the sliding surface 301a is away from the vicinity of the center of the movable part 114. Therefore, it is desirable that the sliding surface 301a is located at a position that does not overlap with not only the image sensor 115 but also the movable part 114 when viewed in the image capturing optical axis direction (the vertical direction in FIG. 9). Since the frictional resistance of the heat dissipation member 300 is further reduced, this variation example is particularly suitable for an apparatus that is desired to further improve the driving controllability of the movable part 114.

The embodiments and the variation examples described above are merely representative examples, and various modifications and changes can be made to the embodiments and the variation examples when the present invention is implemented. For example, the heat source is the image sensor 115 in the embodiments and the variation examples described above. However, the configuration is not limiting as long as the positions of the movable part and the holding part are controlled and an electronic element as a heat source is provided near the movable part and the holding part. Specifically, the present invention is applicable to a configuration where a force sensor provided in a robot hand is a heat source.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008853, filed Jan. 24, 2023, which is hereby incorporated by reference herein in its entirety.

What is claimed is:

1. An image stabilizing mechanism comprising:
a holding part;
a movable part that is in contact with a heat source and is held by the holding part so as to be movable in a first direction and a second direction different from the first direction;
a drive unit configured to generate a driving force for driving the movable part in the first and second directions; and
at least one heat dissipation member that includes a heat transfer member and an elastic member;
wherein the at least one heat dissipation member includes a first connection surface thermally connected to the movable part and a second connection surface thermally connected to the holding part,
wherein one of the first connection surface and the second connection surface is a holding surface that holds a first member among the movable part and the holding part to be thermally connected,
wherein another of the first connection surface and the second connection surface is a sliding surface that is slidingly in contact with a second member among the movable part and the holding part to be thermally connected, and
wherein frictional force generated on the sliding surface is not more than a half of maximum driving force of the movable part generated by the drive unit.

2. The image stabilizing mechanism according to claim 1, wherein the at least one heat dissipation member comprises a plurality of heat dissipation members, and
wherein total frictional force generated on sliding surfaces of the plurality of heat dissipation members is not more than a half of the maximum driving force of the movable part generated by the drive unit.

3. The image stabilizing mechanism according to claim 2, wherein the heat source is an image sensor.

4. The image stabilizing mechanism according to claim 3, wherein the plurality of heat dissipation members are disposed at positions not overlapping the image sensor when viewed in an image capturing optical axis direction so that a product of a distance from a drive axis parallel to the first direction and passing through the image capturing optical axis direction and an area of a sliding surface of one of the heat dissipation members will be about equal to such a product of another of the heat dissipation members and so that a product of a distance from a drive axis parallel to the second direction and passing through the image capturing optical axis direction and an area of a sliding surface of one of the heat dissipation members will be about equal to such a product of another of the heat dissipation members.

5. The image stabilizing mechanism according to claim 1, wherein a cross section of the elastic member in at least one of the first and second directions is an isosceles trapezoid so that a short side of the isosceles trapezoid is on the sliding surface and a long side of the isosceles trapezoid is on the holding surface, wherein a long-side interior angle in a case where the elastic member is maximally deformed in a shearing direction due to generated friction does not exceed 90 degrees.

6. The image stabilizing mechanism according to claim 1, wherein the drive unit includes coils provided on one of the holding part and the movable part and magnets provided on another of the holding part and the movable part at positions respectively facing the coils.

7. The image stabilizing mechanism according to claim 1, wherein the heat transfer member covers at least a part of the elastic member, and both end portions of the heat transfer member are on the side of the holding surface.

8. The image stabilizing mechanism according to claim 7, wherein the both end portions of the heat transfer member are included in the holding surface.

9. The image stabilizing mechanism according to claim 7, wherein the heat transfer member is fixed so as to be in contact with both the first member and the elastic member, and the elastic member is directly fixed to the first member.

10. The image stabilizing mechanism according to claim 1, wherein the sliding surface is parallel to a plane defined by the first direction and the second direction.

11. The image stabilizing mechanism according to claim 1, wherein a surface of the second member that is in contact with the sliding surface of the heat transfer member is subjected to a smoothing process.

12. The image stabilizing mechanism according to claim 1, wherein a smooth member is pasted on a surface of the second member that is in contact with the sliding surface of the heat transfer member.

13. The image stabilizing mechanism according to claim 12, wherein the smooth member is a member of which a static friction coefficient and a dynamic friction coefficient are close.

14. The image stabilizing mechanism according to claim 1, wherein the second member is a flat portion of a substrate to which the heat source is fixed, and a surface that is in contact with the sliding surface of the heat transfer member is a copper foil opening part of the substrate.

15. The image stabilizing mechanism according to claim 1, wherein the heat transfer member is a thin film member having high thermal conductivity and is wound around the elastic member, and wherein the first member has a first inclined surface that is not parallel to a plane defined by the first direction and the second direction, wherein the holding surface is fixed to the first inclined surface, and wherein the at least one heat dissipation member is deformed to be folded.

16. The image stabilizing mechanism according to claim 15, wherein a gap is provided in a part between the heat transfer member and the elastic member.

17. An image capturing apparatus comprising:

an image sensor that is a heat source; and an image stabilizing mechanism configured to drive the image sensor, the image stabilizing mechanism comprising:

holding part;

movable part that is in contact with the image sensor and is held by the holding part so as to be movable in a first direction and a second direction different from the first direction;

drive unit configured to generate a driving force for driving the movable part in the first and second directions; and at least one heat dissipation member that includes a heat transfer member and an elastic member, wherein the at least one heat dissipation member includes a first connection surface thermally connected to the movable part and a second connection surface thermally connected to the holding part, wherein one of the first connection surface and the second connection surface is a holding surface that holds a first member among the movable part and the holding part to be thermally connected, wherein another of the first connection surface and the second connection surface is a sliding surface that is slidingly in contact with a second member among the movable part and the holding part to be thermally connected, and wherein frictional force generated on the sliding surface is not more than a half of maximum driving force of the movable part generated by the drive unit.

* * * * *